United States Patent
Yanyk

(10) Patent No.: US 10,730,425 B2
(45) Date of Patent: Aug. 4, 2020

(54) BOAT LOADING GUIDE

(71) Applicant: Alex Yanyk, Pilot Butte (CA)

(72) Inventor: Alex Yanyk, Pilot Butte (CA)

( * ) Notice: Subject to any disclaimer, the term of this patent is extended or adjusted under 35 U.S.C. 154(b) by 106 days.

(21) Appl. No.: 15/494,229

(22) Filed: Apr. 21, 2017

(65) Prior Publication Data
US 2017/0305324 A1    Oct. 26, 2017

(30) Foreign Application Priority Data
Apr. 21, 2016 (CA) .................................. 2927493

(51) Int. Cl.
*B60P 3/10* (2006.01)

(52) U.S. Cl.
CPC ........... *B60P 3/1075* (2013.01); *B60P 3/1066* (2013.01)

(58) Field of Classification Search
CPC ...... B60P 3/1075; B60P 3/1066; B60P 3/1033
See application file for complete search history.

(56) References Cited

U.S. PATENT DOCUMENTS

| | | | | |
|---|---|---|---|---|
| 3,021,969 A * | 2/1962 | Peake | | B60P 3/1075 280/414.1 |
| 3,160,297 A * | 12/1964 | Auton | | B60P 3/1066 414/532 |
| 3,447,815 A * | 6/1969 | West | | B60P 3/1075 280/143 |
| 3,788,502 A * | 1/1974 | Bell | | B60P 3/1075 414/534 |
| 3,873,130 A * | 3/1975 | Whitley, Jr. | | B60P 3/1075 280/414.1 |
| 3,887,093 A * | 6/1975 | Howell | | B60P 3/1075 114/344 |
| 3,993,324 A * | 11/1976 | Carrick | | B60P 3/1033 280/414.1 |
| 4,011,958 A * | 3/1977 | Carrick | | B60P 3/1033 414/529 |
| 4,268,211 A * | 5/1981 | Schwebke | | B60P 3/1075 280/414.1 |
| 4,623,161 A * | 11/1986 | Sprague | | B60P 3/1075 114/344 |
| 4,715,768 A * | 12/1987 | Capps | | B60P 3/1075 280/414.1 |
| 5,195,767 A * | 3/1993 | Des Roches | | B60P 3/1075 280/414.1 |
| 5,360,226 A * | 11/1994 | Gussler, Jr. | | B60P 3/1075 280/414.1 |
| 6,616,166 B2 * | 9/2003 | Marchese | | B60P 3/1075 280/414.1 |

(Continued)

*Primary Examiner* — Anne Marie M Boehler
*Assistant Examiner* — Michael R Stabley
(74) *Attorney, Agent, or Firm* — Kagan Binder PLLC

(57) ABSTRACT

A boat loading guide system for use on a boat trailer and particularly for pontoon boats and the like. The boat loading guide is highly visible during loading, comprising two guide posts visible throughout the loading process. When not in use, or when towing the trailer, the guide posts are stowed such that the trailer and guide posts do not exceed a pre-determined width, and thus the trailer will be able to be operated legally on public roadways. The guide posts can be of sufficient length so that even when the rear portion of the trailer is well submerged, the guide posts will extend above the surface of the water and be visible to the operator.

19 Claims, 8 Drawing Sheets

(56) References Cited

U.S. PATENT DOCUMENTS

| | | | | |
|---|---|---|---|---|
| 7,017,933 B2* | 3/2006 | Mickley | ................ | B60P 3/1075 |
| | | | | 280/414.1 |
| 7,523,952 B1* | 4/2009 | Spears, Jr. | ............ | B60P 3/1075 |
| | | | | 114/344 |
| 8,256,789 B2* | 9/2012 | Bryant, II | ............. | B60P 3/1075 |
| | | | | 280/414.1 |
| 8,628,105 B2* | 1/2014 | MacKarvich | ......... | B60P 3/1075 |
| | | | | 280/414.1 |
| 9,127,940 B2* | 9/2015 | Nirenberg | ................ | G01C 5/00 |
| 9,676,318 B2* | 6/2017 | Langenfeld | ............ | B60P 3/1075 |
| 2009/0066058 A1* | 3/2009 | Comried, Jr. | ......... | B60P 3/1075 |
| | | | | 280/414.1 |
| 2015/0210201 A1* | 7/2015 | Langenfeld | ........... | B60P 3/1075 |
| | | | | 280/414.1 |

* cited by examiner

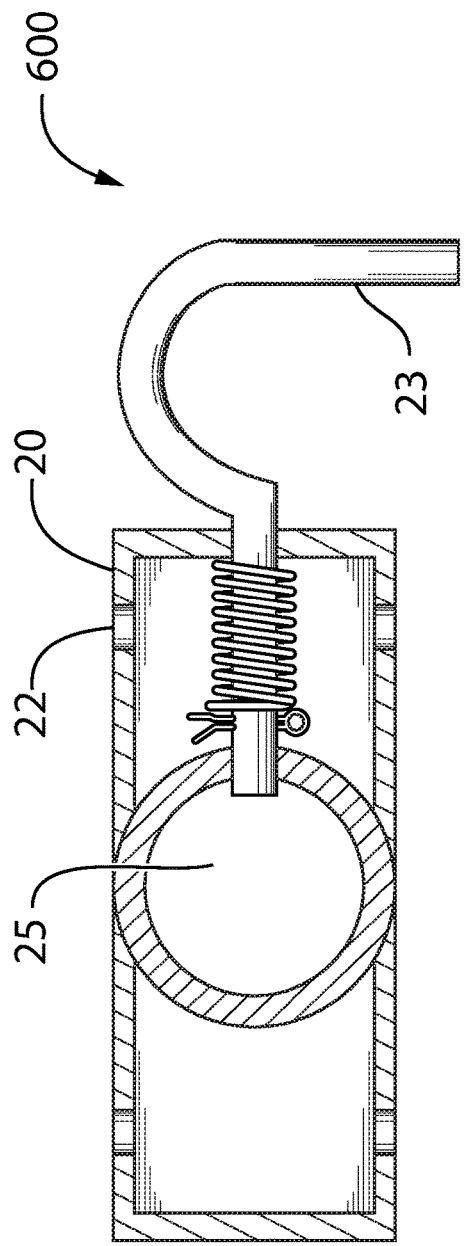
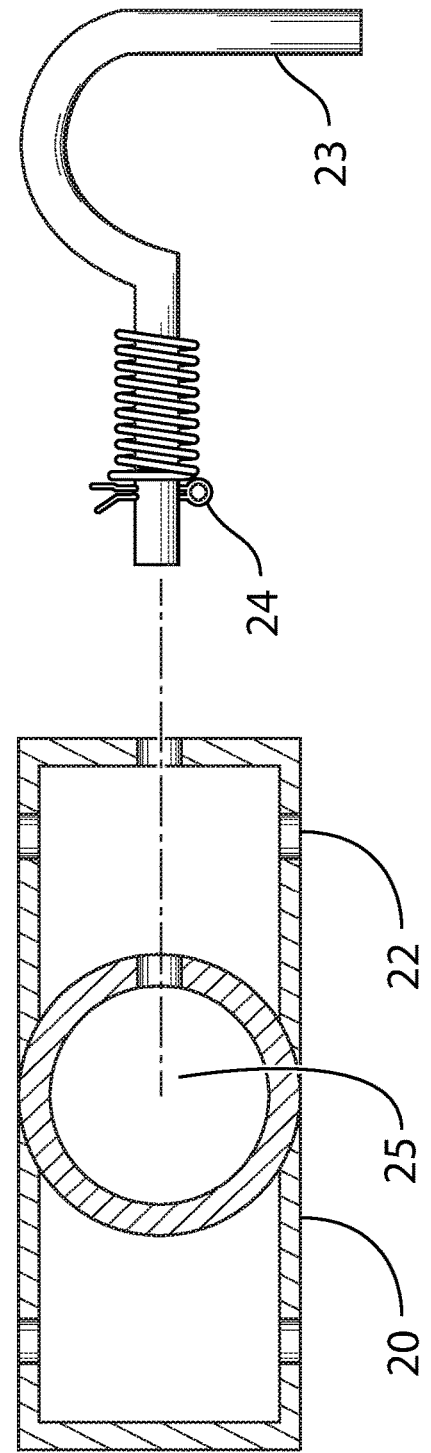
FIG. 6A
FIG. 6B

BOAT LOADING GUIDE

CLAIM OF PRIORITY

The present nonprovisional patent application claims the benefit of and priority to Canadian Patent Application No. 2927493 filed on Apr. 21, 2016 under 35 USC § 119(a), entitled "BOAT LANDING GUIDE" the entirety of which is incorporated herein by reference.

FIELD OF THE INVENTION

The invention is in the field of apparatus and methods for loading and unloading boats onto trailers and in particular for use in loading and unloading pontoon boats onto a trailer.

BACKGROUND

Watercraft such as boats are typically transported from one site to another by means of portable trailers. Trailers are generally designed with a bed on which the boat will rest, and some form of winching system that is designed to move the boat and off the trailer. In most cases, trailers are designed such that the trailer and boat are backed down a slope so that the stern is placed in the body of water. The boat can then be unsecured from the bed and allowed to float off the trailer. The winching system can be designed, for example, to provide a cable that is unwound once the boat is in the water, such that the trailer can then be pulled back up the slope fully and removed from the water, leaving the boat behind. When convenient, the boat can then be disengaged from the winch upon which it is now completely separated from the trailer and is free floating. When extracting a boat from a body of water, the process is reversed. The winch system is used to engage the boat which is pulled towards the trailer, which is typically partially submerged so that the boat can be floated back onto the trailer bed.

One of the challenges in loading a boat onto a trailer is in achieving proper alignment such that the boat comes to rest in a position that is symmetrical with the trailer bed. Failure to do so can result in asymmetric loading of the trailer, which in turn can cause handling problems for the vehicle pulling the trailer. In addition, not having the boat placed squarely on the trailer runs the risk of the boat falling off the trailer. This can lead to damage of the boat, and more importantly, a particularly dangerous and potentially fatal situation should this happen during transport.

In order to assist a user loading a boat onto a trailer, many prior art trailers have include load guides to aid the person loading the boat in placing the boat in a portly aligned configuration as the boat is drawn up onto the trailer bed. Commonly used guides of this type are permanently mounted on either side of the trailer such that there is a few inches of clearance between the guides and the boat as it is being loaded. In use, the boat is allowed to bump back and forth between the guides as it is being hauled onto the trailer deck by the winching system.

A serious limitation in these permanently mounted guides is that by definition they increase the effective width of the trailer. Within North America, and in many countries around the world, vehicles and trailers are limited to certain maximum dimensions. In most North American jurisdictions, the maximum width for a trailer is 102 inches. As a result, permanent mounting of trailer guides on the outboard portion of a boat trailer by definition reduces the maximum width of the trailer deck and in turn limits the width of the boat that can be transported. This is especially problematic in the case of pontoon boats, which typically have widths of 96-102 inches. Thus, transporting a typical pontoon boat on a trailer with outboard guides would in many cases result in a transport configuration that would be in violation of the law.

One prior art solution to the problem posed by pontoon boats has been to provide a trailer with "inboard" guides, that is, guides that are positioned between the pontoons. While this solves the trailer width issue, it results in another problem that makes this a less than ideal solution. Guides spaced to be positioned between the pontoons when the boat is loaded on the deck must be short enough to fit between the pontoon tubes when it is on the trailer. As a result, when the trailer is backed into the water in order to load the boat, the guides will frequently be completely submerged and not visible to the operator performing the loading operation. In addition, even when not completely submerged the operator's ability to view the guides will be blocked by the boat itself as it is winched up onto the trailer deck.

Therefore, what is needed is a boat trailer system including guides that are visible when loading and unloading a boat, especially a pontoon boat, and which when the trailer is configured for transport do not cause the trailer to exceed the maximum allowable width for such units.

SUMMARY OF THE INVENTION

The present invention is a novel loading guide apparatus for loading and unloading watercraft from a conveyance such as a boat trailer or other similar equipment. The loading guide comprises mounting assemblies that are secured to the frame of the conveyance. On each mounting assembly is a guide post assembly that engages the mounting assembly. The guide post assembly comprises an angled structure with a first section engaging the mounting assembly and a second section onto which the guide can be placed.

The apparatus is designed such that the post assembly can be rotated within the mounting portion of the mounting assembly such that the guide can be moved between a horizontal, stowed, position, and a vertical deployed position.

Conveniently, the guide can comprise a buoyant hollow tube that fits over the angled portion of the guide assembly and is sized to be able to slide relatively freely. When the conveyance is in the water to load or unload a watercraft, the guide will float and slide up along the tubular post remaining visible to the user during the entire loading and/or unloading operation. In this way, the margins of the loading area will be marked for the convenience of the user, making it easier for a single user to load and unload a watercraft with relative ease.

Significantly, the apparatus is designed such that the spacing between the guide post assemblies, when mounted on the mounting assemblies, will be no greater than the width of a public roadway. The mounting assemblies are designed to enable different spacings depending on the particular jurisdiction the apparatus is being used in, while still being able to maintain the apparatus and conveyance within legal limits.

Thus, in some embodiments there is provided a loading guide apparatus for assisting a user in the loading and unloading of watercraft from a conveyance, the loading guide comprising: a plurality of guide mounting assemblies, the guide mounting assemblies configured to be reversibly secured to a conveyance for transporting the watercraft; a plurality of guide post assemblies, each guide post assembly connected to one of the plurality of guide mounting assemblies; the guide post assembly further comprising an angled tubular post and a substantially hollow tube, wherein the angled tubular post is sized to fit within the interior of the tube such the tube will be capable of sliding back and forth along the length of the tube; wherein the guide post assembly is movable from a stowed position to a deployed position; and wherein, when in the stowed position, the guide post assemblies are positioned such that the width of the conveyance and loading guide apparatus does not exceed the width of a lane in a public roadway. A public roadway can range in width from about 8.2 feet (2.5 meters) to about 12 feet (3.7 meters).

In some embodiments, a guide mounting assembly is mounted on each side of the conveyance.

In some embodiments, the angled tubular post comprises a first section that engages a guide mounting assembly and a second section over which the substantially hollow tube can be slid, and wherein the intersection of the first and section sections forms an angle of about 90°.

In some embodiments, the first section is rotatable with respect to the guide mounting assembly, such that the second section of the angled tubular post can be moved between a substantially horizontal position to a substantially vertical position, wherein the hollow tube is adapted to slid vertically about the angled tubular post when the tubular post is in the substantially horizontal position.

In some embodiments, the guide mounting assembly further comprises a locking assembly, the locking assembly configured to maintain the angled tubular post in a desired position. In some embodiments, the desired position is one of a stowed position and a deployed position.

In some embodiments, the substantially hollow tube further comprises a material such that the tube will be positively buoyant.

In some embodiments, the substantially hollow tube and the angled tubular post are connected by a flexible line.

In some embodiments, the intersection of the first and section sections forms an angle of about or greater than 90°. In some embodiments, when the angle is greater than 90°, the guide post assembly further comprises a hinge disposed between the first and second sections.

In some embodiments, each guide mounting assembly comprises a plurality of mounting positions for a guide post assembly, such that when in use the spacing between each of the guide post assemblies in the deployed position can be varied.

There is also provided a method of using a loading guide apparatus in the loading a watercraft from a conveyance, the method comprising the steps of: providing a loading guide apparatus, the loading guide apparatus comprising: a plurality of guide mounting assemblies, the guide mounting assemblies configured to be reversibly secured to a conveyance for transporting the watercraft; a plurality of guide post assemblies, each guide post assembly connected to one of the plurality of guide mounting assemblies; the guide post assembly further comprising an angled tubular post and a substantially hollow tube, wherein the angled tubular post is sized to fit within the interior of the tube such the tube will be capable of sliding back and forth along the length of the tube; wherein the guide post assembly is movable from a stowed position to a deployed position; and wherein, when in the stowed position, the guide post assemblies are positioned such that the width of the conveyance and loading guide apparatus does not exceed the width of a lane in a public roadway. The method including the steps of securing the plurality of guide mounting assemblies to the conveyance; securing a guide post assembly to each guide mounting assembly, and configuring each guide post assembly in the stowed position; positioning the conveyance near a watercraft to be loaded; moving each guide post assembly from the stowed position to the deployed position; connecting the watercraft to a winching system or device; drawing the watercraft onto the conveyance or trailer; securing the watercraft in position once the watercraft is in a desired position on the conveyance; and moving each guide post assembly from the deployed position to the stowed position.

In some embodiments of the method, a guide mounting assembly is mounted on each side of the conveyance.

In some embodiments of the method, the angled tubular post comprises a first section that engages a guide mounting assembly and a second section over which the substantially hollow tube can be slid, and wherein the intersection of the first and section sections forms an angle of about 90°.

In some embodiments of the method, the first section is rotatable with respect to the guide mounting assembly, such that the second section of the angled tubular post can be moved between a substantially horizontal position to a substantially vertical position, wherein the hollow tube is adapted to slid vertically about the angled tubular post when the tubular post is in the substantially horizontal position.

In some embodiments of the method, the guide mounting assembly further comprises a locking assembly, and the locking assembly is engaged such that the angled tubular post is maintained in a desired position. In some embodiments of the method, the desired position is one of a stowed position and a deployed position.

In some embodiments of the method, the substantially hollow tube further comprises a material such that the tube will be positively buoyant.

In some embodiments of the method, the method further comprises connecting the substantially hollow tube and the angled tubular post with a flexible line.

In some embodiments of the method, the intersection of the first and section sections forms an angle of about or greater than 90°. In some embodiments of the method, when the angle is greater than 90°, the guide post assembly further comprises a hinge disposed between the first and second sections.

In some embodiments of the method, the method comprises providing a plurality of guide mounting assemblies that have a plurality of mounting positions for a guide post assembly, such that when in use the spacing between each of the guide post assemblies in the deployed position can be varied.

There is also provided a method of using a loading guide apparatus in the unloading a watercraft from a conveyance, the method comprising the step of reversing the steps of loading a watercraft as described above. In some embodiments of the method, each guide mounting assembly is left in position on the conveyance.

BRIEF DESCRIPTION OF THE DRAWINGS

To easily identify the discussion of any particular element or act, the most significant digit or digits in a reference number refer to the figure number in which that element is first introduced.

FIGS. 6A and 6B illustrate a side view (600) of a mounting assembly that is used to secure a loading guide post to a trailer frame, wherein FIG. 6A depicts a locking pin in the engaged position, and FIG. 6B depicts the locking pin removed from the assembly.

FIG. 7A depicts an embodiment having multiple mounting positions, and FIG. 7B depicts an exemplary clamping device or mechanism.

FIG. 8A depicts a guide post assembly in the assembled configuration, while FIG. 8B depicts the separated components of an embodiment of a guide post assembly.

DETAILED DESCRIPTION

The present disclosure describes a novel system to improve the ease and safety with which boats, and in particular pontoon boats, can be loaded and unloaded from a trailer. The use of loading guides to keep a boat aligned with a trailer while loading and unloading is well knows in the art. However, there are several limitations in prior art guide, especially when used with pontoon boats. Two notable deficiencies relate to the visibility of the guides when the boat is moving on or off the trailer, or when loading and unloading on a steeply pitched access to the water, or because the guides cause the trailer to exceed maximum allowable width for use of trailers on public roadways. Embodiments of the present invention provide for a system of loading guides the overcome all the limitations inherent in the prior art.

In one example of a boat loading guide system of the present invention, the system comprises a mounting assembly configured to secure guide posts to a conventional boat towing trailer. The assembly is further designed such that when not in use, or when towing the trailer, the guide posts are stowed such that the trailer and guide posts do not exceed a pre-determined width, and thus the trailer will be able to be operated legally on public roadways. The design of the system is also such that when the guideposts are moved from the stowed to a deployed position, the post will be placed outside the perimeter of the boat being loaded onto the trailer. In this way, the guide posts will be visible throughout the entire loading and/or unloading process. Further, in the present invention the guideposts can be designed to have a length such that they will remain visible to the operator loading or unloading the boat, even when operating on a steeply inclined waterfront. The guideposts can be of sufficient length so that even when the rear portion of the trailer is well submerged, the guideposts will extend above the surface of the water and be visible to the operator.

Figure 1:
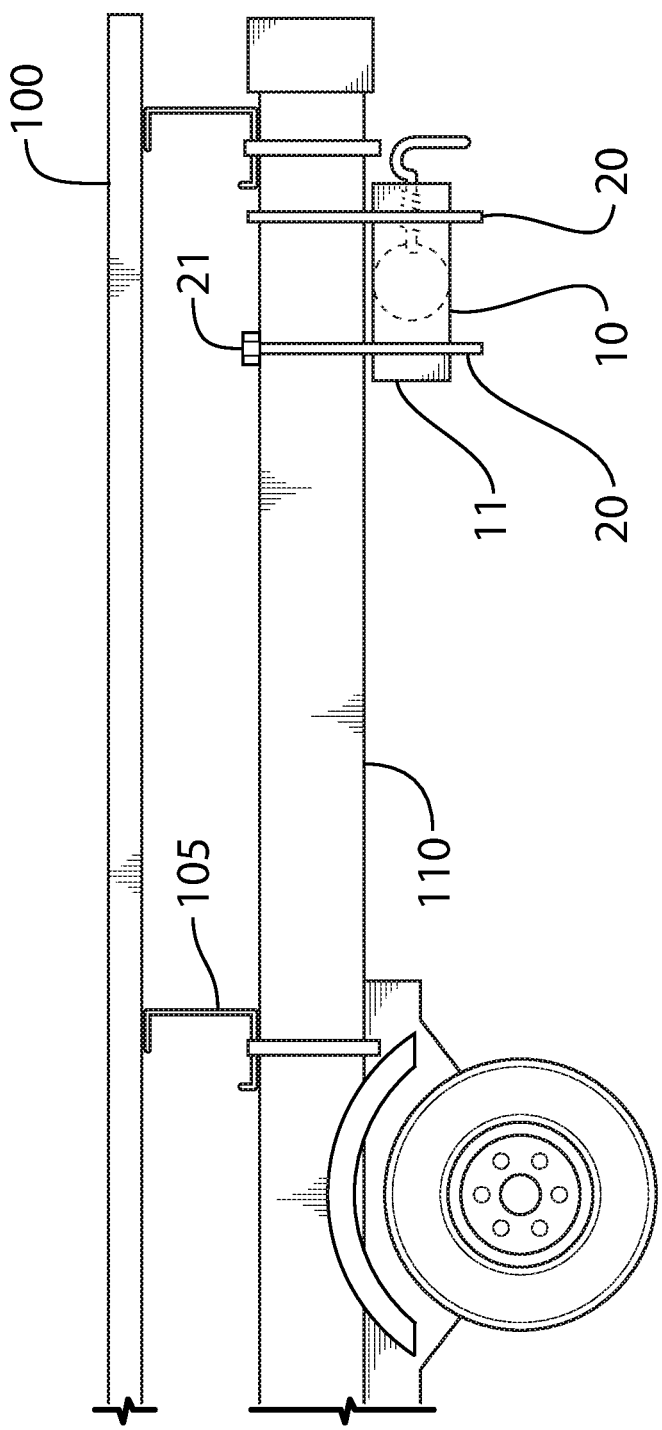
FIG. 1 illustrates a side view of an exemplary embodiment of a trailer mount of the present disclosure, without the loading guide posts installed.
Figure 4:
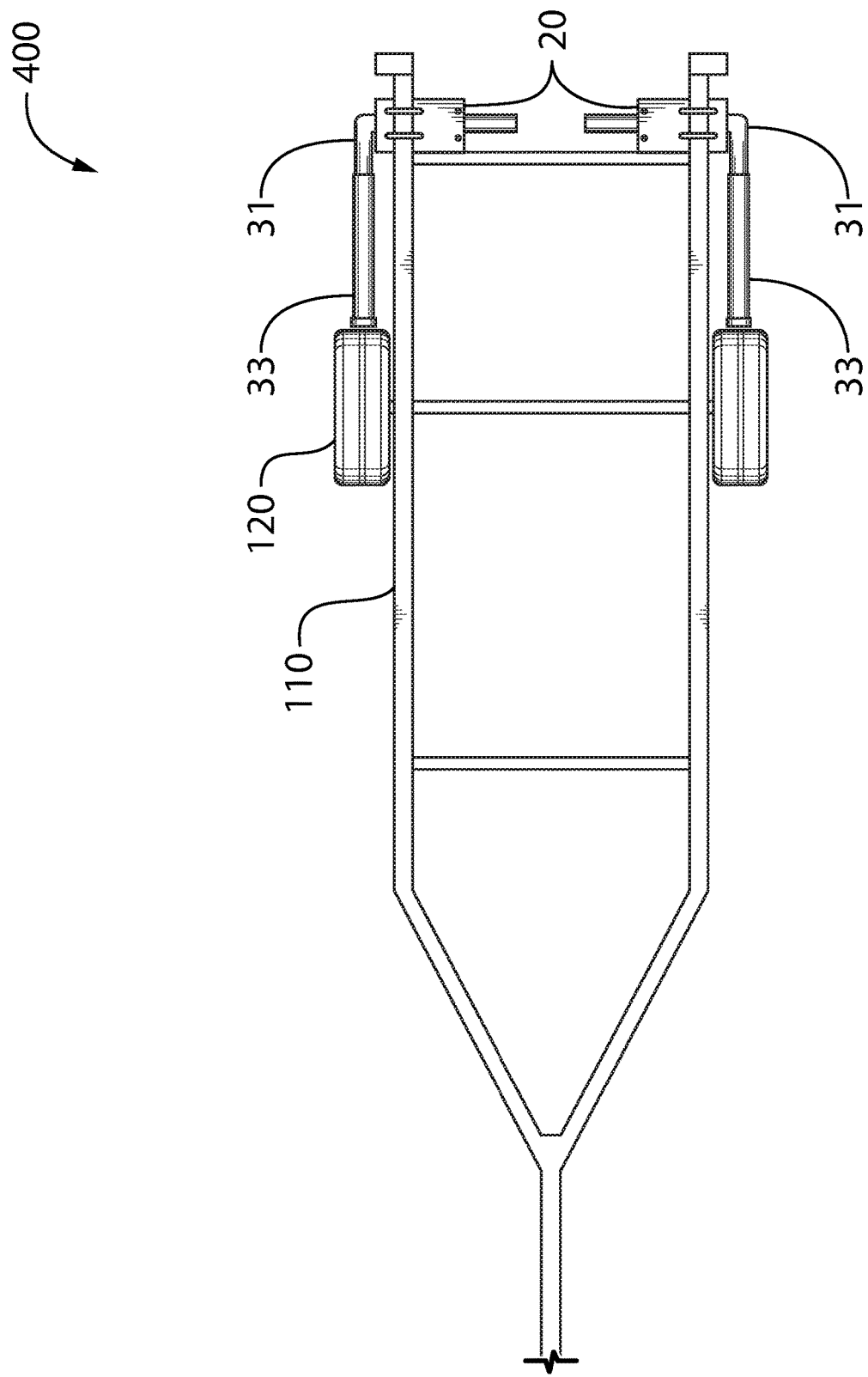
FIG. 4 illustrates a top view (400) of an exemplary embodiment of a trailer mount of the present disclosure, showing the relationship of the loading guide posts relative to the trailer frame in a stowed configuration.
Figure 5:
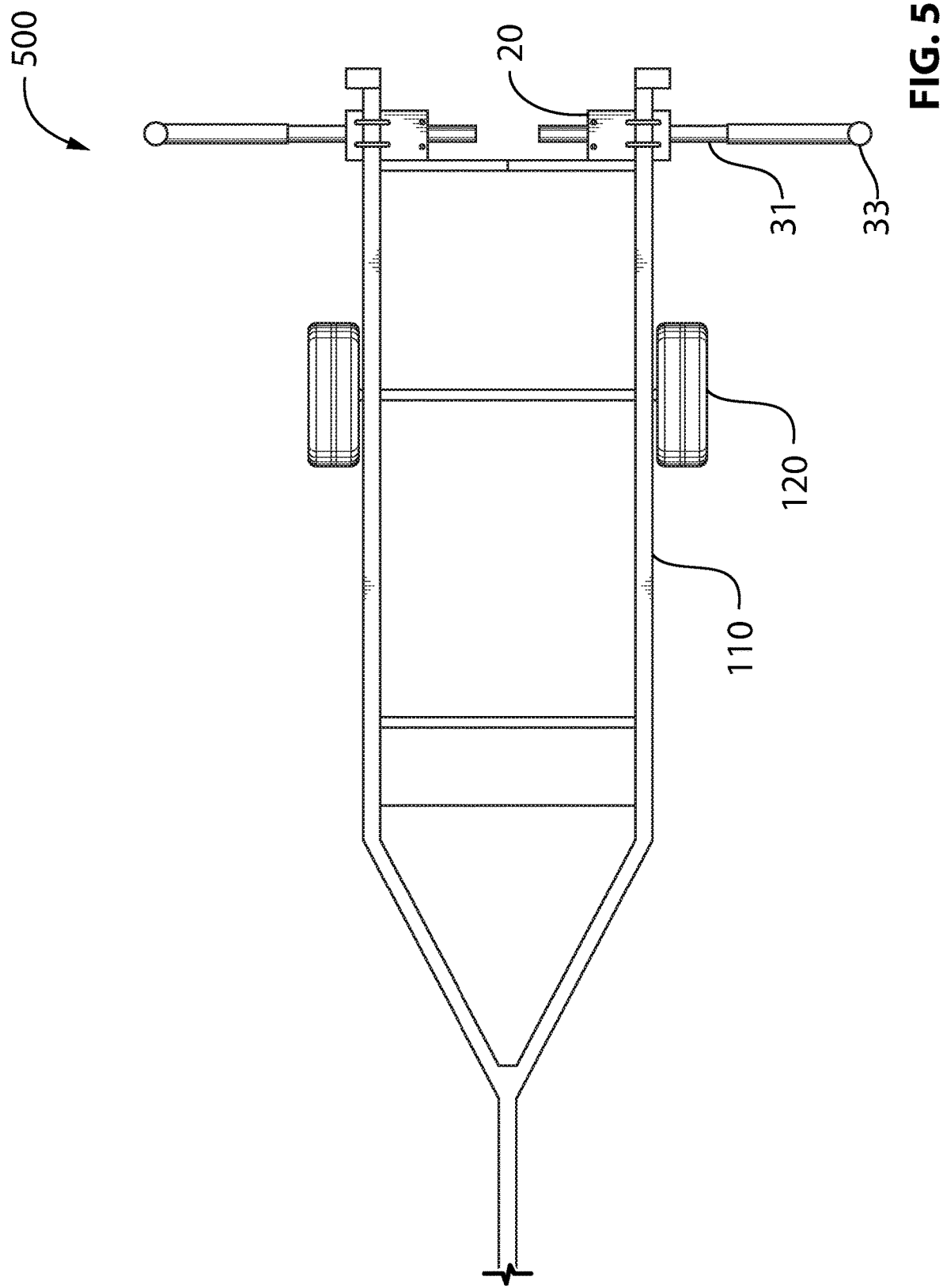
FIG. 5 illustrates a top view (500) of an exemplary embodiment of a trailer mount of the present disclosure, with the loading guide post positioned in a deployed configuration.
Figure 7B:
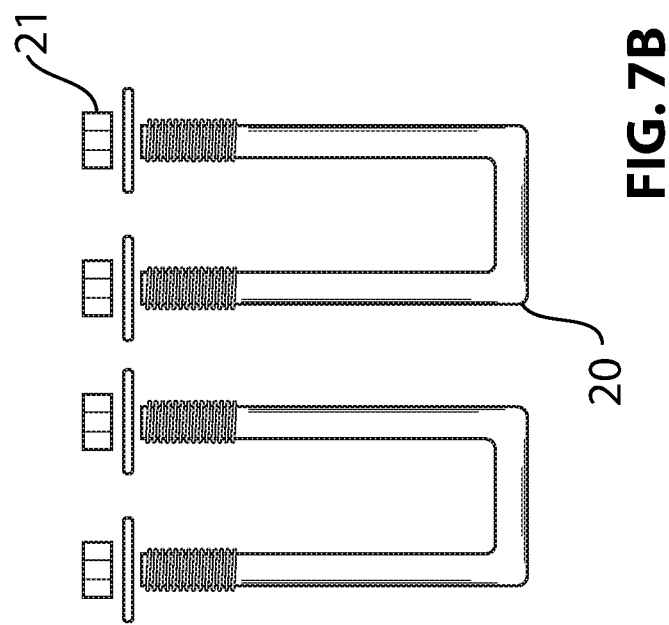
FIGS. 7A and 7B illustrate a bottom view of an exemplary embodiment of a mounting assembly that secures a loading guide post to a trailer frame.
Figure 7A:
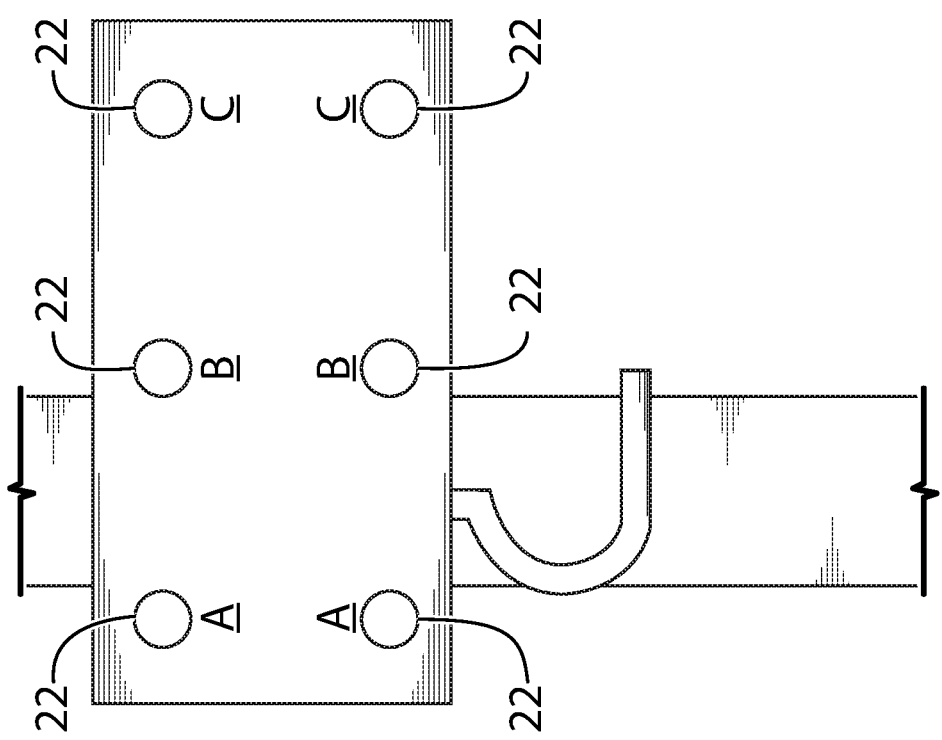

Referring now to FIG. 1, FIG. 4 and FIG. 5, one part of the system comprises a guide mounting assembly 10 that is configured to be secured to a trailer frame 110 using one or more U-bolts 20 and fasteners 21. As those of skill in the art will appreciate, the U-bolt 20 can be installed from above or below the frame, and secured in place with conventional fasteners. Conveniently, the U-bolts will extend through holes in the body 11 of the guide mount assembly, thus securing the assembly to the frame when the fasteners are secured. As shown in FIGS. 7A and 7B, the body of the guide mounting assembly can include a plurality of holes 22 through which the U-bolts can extend. In some embodiments, multiple sets of holes (labelled as A, B and C in the exemplary embodiment) can be provided such that the precise mounting position relative to the trailer frame can be varied, thus providing a measure of fine tuning of the final width of the loading guide posts when they are installed on the guide mounts.

For example, and as illustrated in FIG. 7A, in one case, holes labelled A and B may be used to provide one particular spacing between the loading guideposts, while using holes B and C to secure the assembly to the trailer frame will result in a different spacing between the loading guide posts once they are installed. The mounting assembly is designed such that it can be mounted above or below the trailer frame and still function appropriately. Referring to FIGS. 6A and 6B, it will be seen that within the body of the mounting assembly 20 will be a tube-like structure, or mounting sleeve 25, adapted to receive a loading guide post.

Figure 8B:
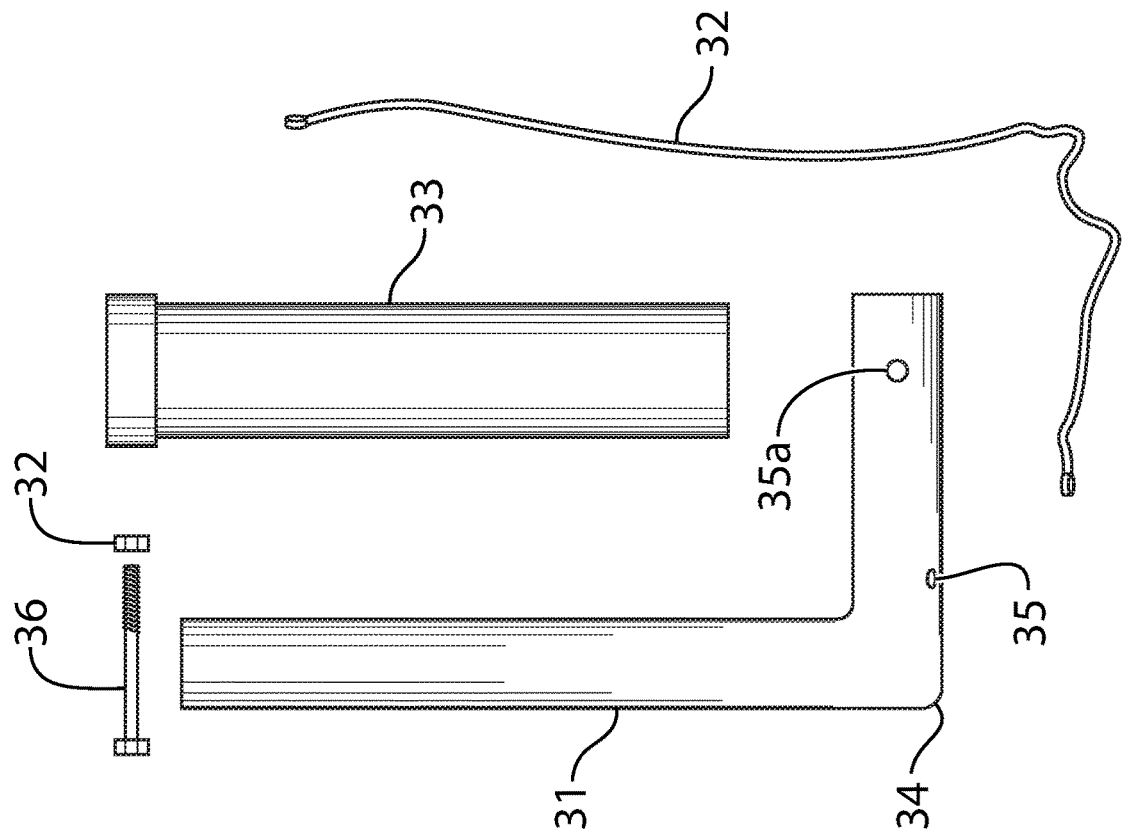
FIGS. 8A and 8B illustrate a side view of an exemplary embodiment of a trailer mount of the present disclosure, depicting a complete loading guide post assembly and an assembly broken down into its constituent parts.
Figure 8A:
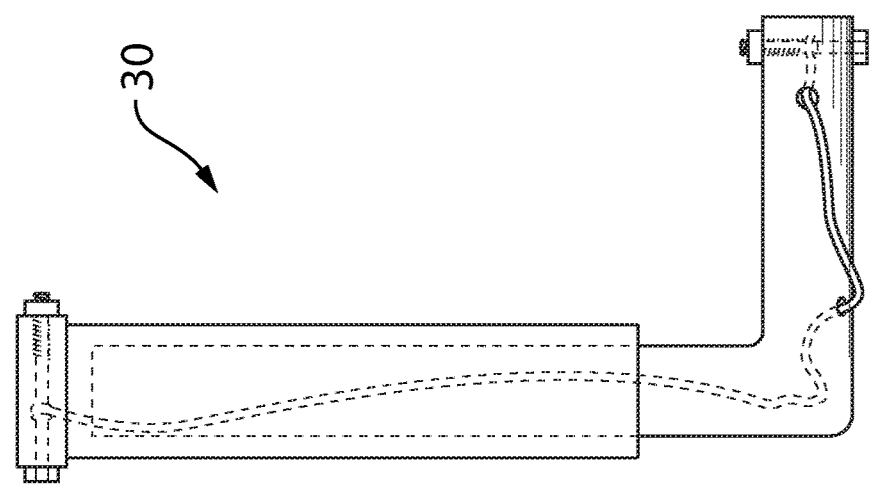

Along with the mounting assembly, the apparatus further comprises the loading guide post assembly 30. In one embodiment, depicted in FIGS. 8A and 8B, a loading guide post assembly comprises an angled tubular post 31 designed to fit within the mounting sleeve described above. The tubular post is designed such that it forms an angled structure. In some cases, the interior angle (alpha) along the body of the tubular post can be about 90 degrees. In other cases, it may be desirable for the tubular post to have an interior angle (alpha) of greater than 90 degrees to allow for the loading guide posts to extend away from the body of the boat when in the deployed position. Where an angle greater than 90 degrees is desired, the tubular post can be designed to include a hinged structure (not illustrated) at the site of the angled portion 34 so that the post can be nested near to the frame in order to avoid the overall width of the trailer and accessories exceeding a predetermined width. FIG. 8A shows an embodiment of a guide post assembly in an assembled configured, while FIG. 8B depicts the separate components of the assembly for ease of visualization The loading post guide further comprises a capped tube 33 that is sized to be able to fit over, and slide relative to, the tubular post. The capped tube can be fashioned from PVC pipe or any other suitable material according to the preference of the manufacturer. A flexible line 32, depicted as a rope in FIGS. 8A and 8B, secures the tubular post and capped tube to each other, while allowing the capped tube to move back and forth along the length of the tubular post. The length of the line can be selected such that the capped tube can move along virtually the entire length of the tubular post, without actually disengaging from the post. Those of skill in the art will recognize that this provides a novel manner in which to length or shorten the length of the loading guide post, and that the tubular post will in effect float in response to the position of the surface of the water relative to the mounting assembly to which the tubular post is secured. Thus, one steeper inclined waterfronts, the capped tube will be able to move outward along the tubular post, the result being that the top of the capped tube will at all times remain visible to the operator who is handling the loading of the boat. This obviates the need for an additional spotter to communicate to the operator the relative position of the guides and the boat during loading.

Figure 3:
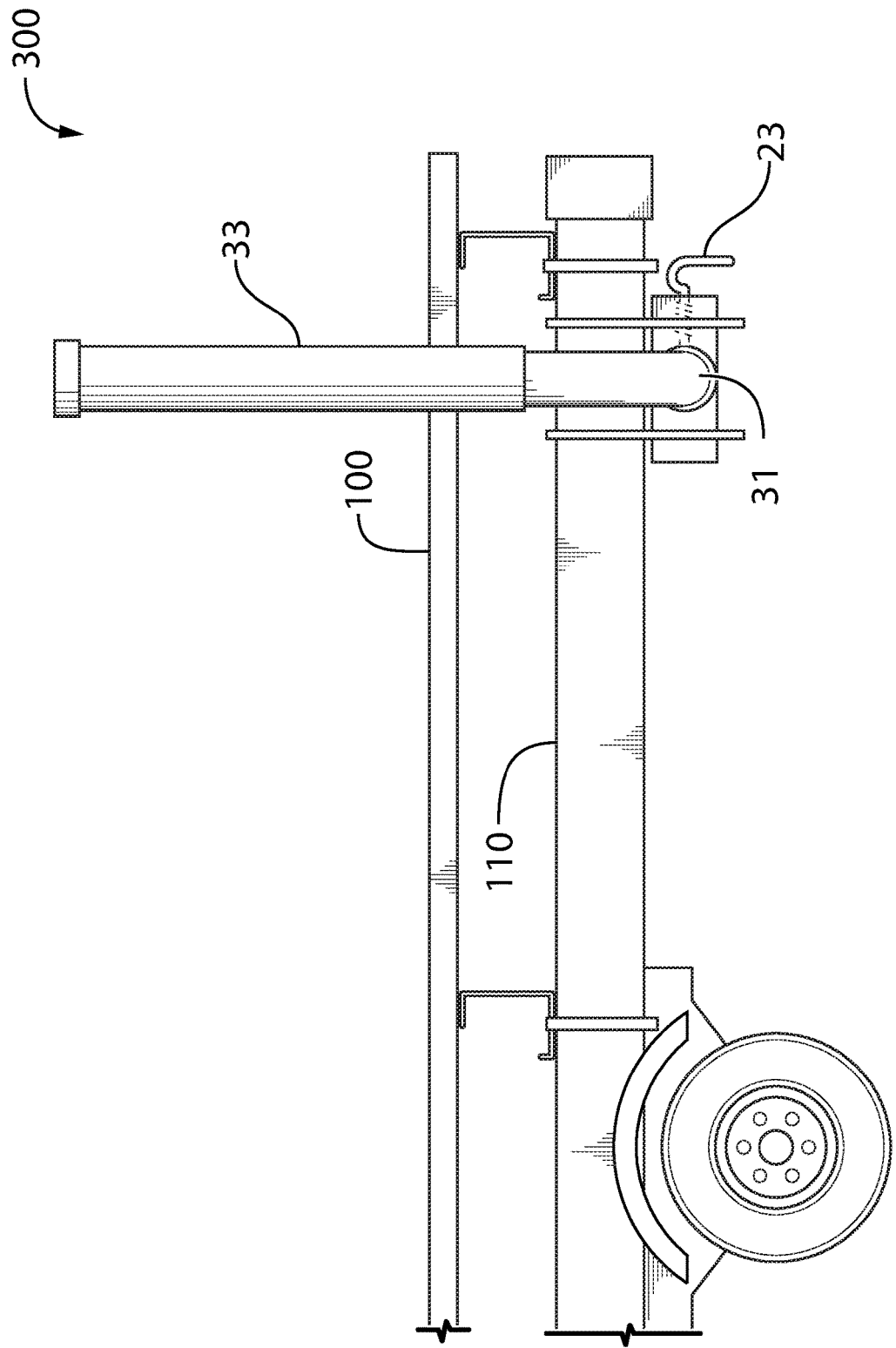
FIG. 3 illustrates a side view (300) of an exemplary embodiment of a trailer mount of the present disclosure, with a loading guide post shown in the deployed configuration.

As shown in FIGS. 8A and 8B, one end of the tubular post will include holes 35, 35a into which a locking pin assembly 23 can engage the post and secure it in either a stowed or deployed position (See also FIGS. 6A and 6B). As can be appreciated by reference to the figures, the tubular post slides into the mounting sleeve of the mounting assembly. In the stowed position, the extended portion of the tubular post is positioned roughly parallel to the longitudinal axis of the trailer frame, and secured into position by the lock pin assembly. A spring or similar bias member can be included to maintain a bias force that keeps the lock pin inserted into the appropriate hole in the tubular post. When deployed, the lock pin 23 can be withdrawn from the hole it is engaged in, and the tubular post rotated within the mounting assembly. This will allow the user to move the loading guide post to a substantially vertical position, such that the guide post extends upwards from the trailer frame, as depicted in FIG. 3. See also FIG. 4 and FIG. 5. Once in position, the tubular post will be in register or alignment with a second set of holes 35a into which the lock pin can be inserted to now maintain the loading guide post assembly in the desired deployed position.

Figure 2:
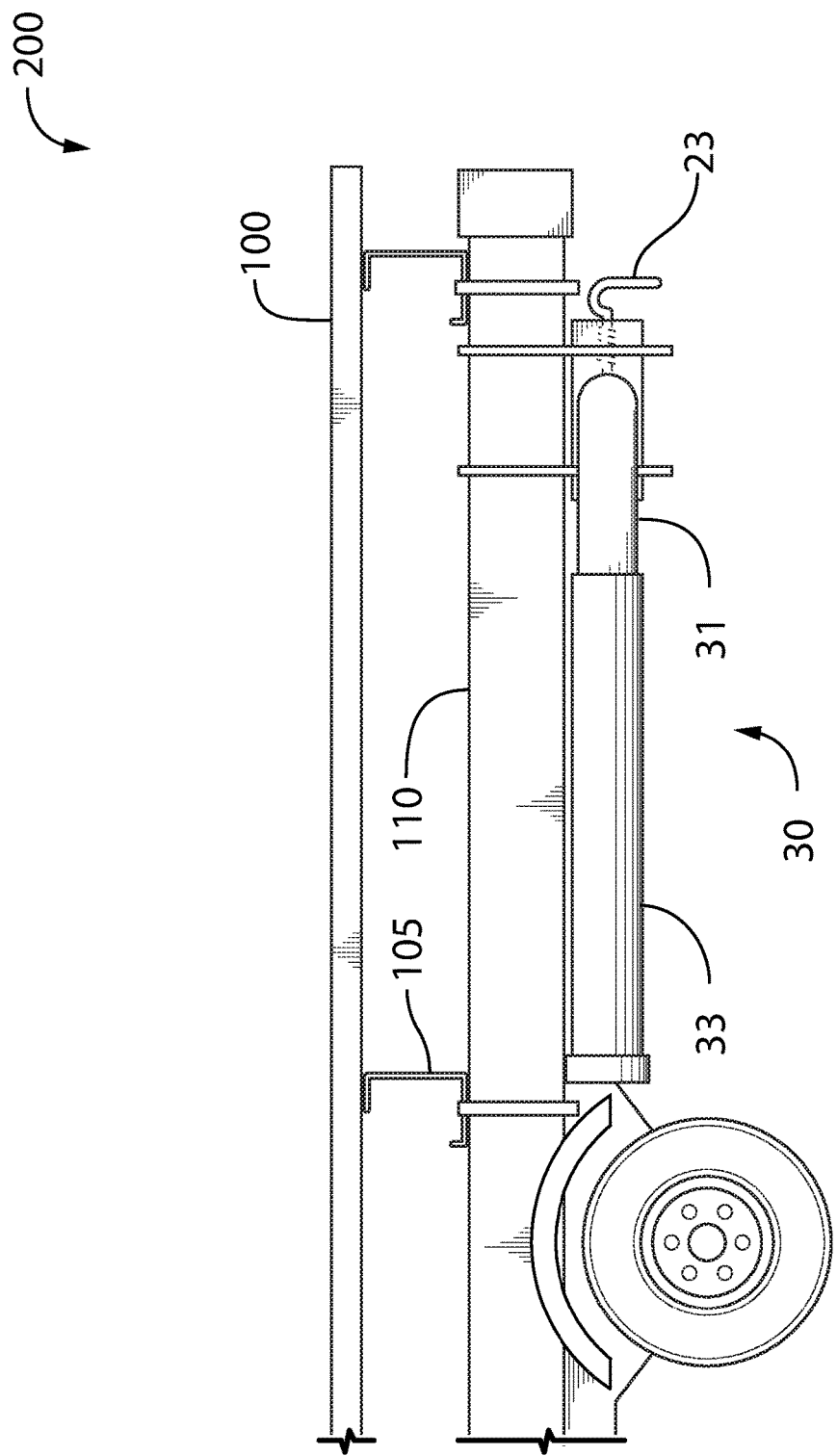
FIG. 2 illustrates a side view (200) of an exemplary embodiment of a trailer mount of the present disclosure, with loading guide posts in the stowed configuration.

The apparatus of the present invention is also simple to use and in most cases will allow one person to load or unload a boat from a trailer. Starting with an empty trailer, the user will place the tubular post and guide post assembly in the stowed position as shown in FIG. 2 and FIG. 4. The guide post assembly when position in this manner will generally be tucked in behind the trailer wheels and will be within the normal width of the trailer, ensuring that the width of the trailer remains within legal limits for the width of vehicles and trailers used on public roadways.

In order to load a boat, prior to backing the trailer into the water, the user will disengage each guide post assembly in turn and move the assembly from the stowed to the deployed position, the deployed position being shown in FIG. 3 and FIG. 5. The trailer can then be backed into the water as would be done with a conventional trailer and the boat guided towards the trailer bunk by referencing the loading guide post. As described above, the capped tube is designed to move over the tubular post so that as the trailer is backed further into the water, the capped tube will become buoyant and float upwards along the tubular post. In this way, the capped tube will continued to provide an easily seen visual reference as to the position of the loading guide posts.

As with other trailer systems, the user would then secure the boat to a winch system, and then using the winch, draw the boat towards the front of the trailer. The loading guide posts would function to maintain alignment of the boat with the trailer bed as it is winched in place. As with other trailers, in some cases it would be convenient to provide a trailer having a carpeted bunk designed to receive the boat and provide a surface upon which the boat will ultimately rest when secured for transport.

Once the boat is full winched onto the trailer, the boat could then be further secured with ropes, straps or other securements as are well known to those who operate and transport boats and other watercraft. Once the boat is secured, the loading guide posts would then be returned to the stowed position for transport.

Thus, the present invention provides a novel loading guide that is visible even when loading boats such as pontoon watercraft, and in conditions such as steep inclines when other guides would be underwater and not visible to the person attempting to load the boat onto the trailer. The system provides the further advantage that when configured for transport the guide posts are stowed such that the overall width of the trailer is maintained within legal limits for use on public roadways.

It will be apparent to those of skill in the art that by routine modification the present invention can be optimized for use in a wide range of conditions and application. It will also be obvious to those of skill in the art that there are various ways and designs with which to produce the apparatus and methods of the present invention. The illustrated embodiments are therefore not intended to limit the scope of the invention, but to provide examples of the apparatus and method to enable those of skill in the art to appreciate the inventive concept.

Those skilled in the art will recognize that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. A loading guide apparatus for assisting a user in the loading and unloading of watercraft from a conveyance, the loading guide comprising:
   a plurality of guide mounting assemblies, each comprising a tubular member configured to be secured to a conveyance for transporting the watercraft;
   a guide post assembly corresponding and connected to each guide mounting assembly, and comprising a hollow tube and an angular tubular post,
   sized to fit within the interior of the hollow tube such that the angled tubular post will be capable of sliding within and along the length of the hollow tube between a deployed position and a respective stowed position;
   wherein when in the respective stowed position each guide post assembly is positioned within a predefined safe transport width of the conveyance for movement along a roadway;
   wherein the hollow tube of each guide post assembly is connected to the corresponding guide mount assembly to pivot between a vertical and a horizontal position and can be selectively secured in said horizontal or vertical position; and
   wherein each guide post assembly is movable between the deployed position and the stowed position without removing the guide post assembly from the corresponding guide mounting assembly.

2. The loading guide of claim 1, wherein a at least one guide mounting assembly is mounted on each side of the conveyance.

3. The loading guide of claim 2, wherein each guide mounting assembly comprises a plurality of mounting positions for a guide post assembly, such that when in use a spacing between laterally opposite and corresponding guide post assemblies in the deployed position can be varied.

4. The loading guide of claim 1, wherein the hollow post of at least one guide post assembly comprises a first section that engages the corresponding guide mounting assembly and a second section over which the hollow tube can be slid, and wherein the intersection of the first and second sections forms an angle greater than 90°.

5. The loading guide of claim 4, wherein the first section of the angled tubular post is rotatable with respect to the guide mounting assembly such that the second section of the angular tubular post can be moved between a horizontal position and a vertical position, wherein the hollow tube is adapted to slide vertically about the angular tubular post when in the horizontal position.

6. The loading guide of claim 5, wherein the guide mounting assembly further comprises a locking assembly to maintain the angled tubular post in a desired position.

7. The loading guide of claim 6, wherein the desired position is one of a stowed position and a deployed position.

8. The loading guide of claim 4, wherein at least one guide post assembly further includes a hinge disposed between the first and second sections.

9. The loading guide of claim 1, wherein the hollow tube further comprises a buoyant material.

10. The loading guide of claim 1, wherein the hollow tube and the angled tubular post of at least one post guide assembly are connected by a flexible line.

11. The loading guide of claim 1, wherein the guide mounting assembly comprises a mounting sleeve and the angular tubular post fits within and is rotatable with respect to the mounting sleeve.

12. A method of using a loading guide apparatus in the loading of a watercraft to a conveyance, the method comprising:
    providing a loading guide apparatus comprising:
        a plurality of guide mounting assemblies each comprising a tubular member configured to be secured to a conveyance for transporting the watercraft;
        a guide post assembly corresponding and connected to each guide mounting assembly and comprising a hollow tube and an angled tubular post sized to fit within the interior of the hollow tube such the post will be capable of sliding within and along the length of the tube between a deployed position and a respective stowed position;
    wherein when in the respective stowed position each guide post assembly is positioned within a predefined safe transport width of the conveyance for movement along a roadway; and
    wherein each guide post assembly is movable between the deployed position and the stowed position without removing the guide post assembly from the corresponding guide mounting assembly attached to the conveyance;
    positioning the conveyance near a watercraft to be loaded;
    moving each guide post assembly from the stowed position to the deployed position;
    connecting the watercraft to a winching system;
    drawing the watercraft onto the conveyance, the guide post assemblies assisting in positioning the watercraft on the conveyance;
    securing the watercraft in position once the watercraft is in a desired position on the conveyance; and
    moving each guide post assembly from the deployed position to the stowed position.

13. The method of claim 12, wherein at least one guide mounting assembly is mounted on each side of the conveyance.

14. The method of claim 12, wherein an angled tubular post comprises a first section that engages the corresponding guide mounting assembly and a second section over which the hollow tube can slide, and wherein the intersection of the first and second sections forms an angle about greater than 90°.

15. The method of claim 14, wherein the first section of the angled tubular post is rotatable with respect to the corresponding guide mounting assembly, such that the second section of the angled tubular post can be moved between a horizontal stowed position to a vertical deployed position, and wherein the hollow tube is adapted to slide vertically about the angled tubular post in its vertical deployed position.

16. The method of claim 15, wherein at least one of the guide mounting assemblies further includes a locking assembly adapted to be engaged such that the angled tubular post is maintained in its stowed position or deployed position.

17. The method of claim 14, wherein at least one of the guide post assemblies further includes a hinge disposed between the first and second sections.

18. The method of claim 12, wherein the hollow tube further comprises a buoyant material.

19. The method of claim 12, further comprising the step of connecting a hollow tube with its corresponding angled tubular post with a flexible line.

\* \* \* \* \*